(12) United States Patent
Goodson (10) Patent No.: US 11,202,696 B2
(45) Date of Patent: Dec. 21, 2021

(54) DENTAL IRRIGATION DEVICE

(71) Applicant: Mark E Goodson, Corinth, TX (US)

(72) Inventor: Mark E Goodson, Corinth, TX (US)

( * ) Notice: Subject to any disclaimer, the term of this patent is extended or adjusted under 35 U.S.C. 154(b) by 0 days.

(21) Appl. No.: 16/848,835

(22) Filed: Apr. 14, 2020

(65) Prior Publication Data

US 2020/0345469 A1 Nov. 5, 2020

Related U.S. Application Data

(60) Provisional application No. 62/833,736, filed on Apr. 14, 2019.

(51) Int. Cl.
| | |
|---|---|
| *A61C 17/02* | (2006.01) |
| *B05B 9/00* | (2006.01) |
| *B05B 9/04* | (2006.01) |
| *B01F 1/00* | (2006.01) |
| *B01F 15/06* | (2006.01) |

(52) U.S. Cl.
CPC ............ *A61C 17/02* (2013.01); *B01F 1/0038* (2013.01); *B01F 15/065* (2013.01); *B05B 9/002* (2013.01); *B05B 9/0403* (2013.01); *B01F 2015/062* (2013.01); *B01F 2215/0027* (2013.01)

(58) Field of Classification Search
CPC .............. B67D 1/0895; A47J 31/0573; A61C 17/0205; B01F 11/0258
See application file for complete search history.

(56) References Cited

U.S. PATENT DOCUMENTS

| | | | | |
|---|---|---|---|---|
| 2008/0255498 | A1* | 10/2008 | Houle | ................ A61C 17/0208 604/20 |
| 2016/0287010 | A1* | 10/2016 | Doglioni Majer | ..... H05B 6/108 |

* cited by examiner

*Primary Examiner* — Elizabeth Insler
(74) *Attorney, Agent, or Firm* — Gunn Lee & Cave, PC (57) ABSTRACT

A dental irrigation device for heating a solution and mixing solutes within the solution. The present invention utilizes an oscillator and inductive coil to heat and/or mix the solution. A pump then delivers the heated and mixed pressurized solution from a basin ultimately into a dispenser.

5 Claims, 9 Drawing Sheets

DENTAL IRRIGATION DEVICE

CROSS REFERENCE TO RELATED APPLICATIONS

This application claims the benefit of and priority to U.S. Provisional Application No. 62/833,736, filed Apr. 14, 2019, entitled "Dental Irrigation Device." This application is incorporated by reference.

STATEMENT REGARDING FEDERALLY SPONSORED RESEARCH OR DEVELOPMENT

Not Applicable

BACKGROUND OF THE INVENTION

1. Field of the Invention

The present invention relates to a device for the aqueous irrigation of dental tissue.

2. Description of the Related Art

It is well known that dental tissue benefits from the addition of certain solutes when the teeth and gums are irrigated, with water being considered as the solvent. Such solutes include salt, mouthwashes, and hydrogen peroxide. The matter and sufficiency for which they dissolve and mix are based on two major factors, dispersion and temperature. The temperature factor is even more important in certain compounds such as salt because solubility increases as temperature rises.

One product design intended to heat irrigated water is described in U.S. Pat. No. 7,059,853. As quoted from the specification, A controlled water stream, whether streaming or pulsing may be delivered at room or tap temperature or alternatively heated to about 90 degrees Fahrenheit, for example (heating not shown). U.S. Pat. No. 8,012,111 describes the mixing of both cold and hot water from the sink water lines. However if the sink's hot water faucet is located away from the hot water heater, this system requires the water to run for a lengthy period of time wasting water.

The aforementioned solutions are imperfect and there remains a need to develop a dental irrigation device with the ability to booth heat and mix the solute and solvent in an efficient and convenient manner.

BRIEF SUMMARY OF THE INVENTION

The present invention utilizes heating and mixing componentry to raise the temperature of the water and to mix a solute within the solution before the solution is introduced into the oral cavity by way of pressurized water jet. The invention present invention comprises a basin, heating/mixing componentry, base, a pump, and a handheld dispenser. Normal tap water is placed in a basin which is delivered via pump to a dispenser. In one embodiment, an inductor coil is utilized within the basin to heat and mix the solute with the solution. In a second embodiment, a ferrous slug rotates within the basin mixing the solute with the solution. As this mixed solution is delivered to the dispenser via a pump, the solution passes through a heating chamber using a ferrous inductor coil system that heats the solution. The pressurized solution is then delivered to the dispenser which allows for a jet stream of solution to be aimed by the user at the affected dental tissue. The pressurized solution stream can dislodge particulate accumulations, thereby promoting dental health. The pump has a modulating system that can alter the solution stream to have either continuous flow or pulsed characteristics. The open top basin allows the addition of salts or medicine to the solution for treatment of medical conditions.

DETAILED DESCRIPTION OF THE INVENTION

FIGS. 1-5 disclose a first embodiment of a dental irrigation device 1 comprising a basin 10, a base 40, and a dispenser 80. The basin 10 comprises a sidewall 11, a bottom wall 12, and an open top 13. Alternatively a removable lid may be placed on top of the basin 10. The top surface 14 of the bottom wall 12 is continuous having a raised portion 15 and a lowered portion 16 connected by a slope 17. The lower portion 16 may further slope to a port 18. The raised portion 15 further contains a convex portion 19. A first recess 20 and a second recess 21 are positioned within the bottom surface of the raised portion 15 of the bottom wall 12. The first recess 20 and second recess 21 are positioned adjacent to the convex portion 19 on the top surface 14 of the bottom wall 12. A first metal connectivity tab 22, and second metal connectivity tab 23 are positioned at the top of the first recess 20 and second recess 21 respectively. A continuous notch 24 is formed at the juncture of the sidewall 11 and bottom wall 12.

A cylindrical housing 25, having an inner wall 26, outer wall 27, and top wall 28, is positioned on the raised portion 15 of the bottom wall 12 of the basin 10. The cylindrical housing 25 is positioned such that the convex portion 19 is wholly within the inner wall 26 of the cylindrical housing 25. The cylindrical housing 25 is further positioned such that the first recess 21 and second recess 22 are directly below the inner wall 26 and outer wall 27. An inductive coil 29, having a first end 32 and a second end 33, is positioned within the cylindrical housing 25 and wraps around the inner wall 26 filling the space between the inner wall 26 and the outer wall 27. The inner wall 26, outer wall 27, and top wall 28 of the cylindrical housing 25 are integral to prevent the solution 2 from coming into contact with the inductive coil 29. The first end 32 of the inductive coil 29 is in contact with the first metal connectivity tab 22 and the second end 33 of the inductive coil 29 is in contact with the second metal connectivity tab 23. A ferrous slug 30 having a polymer surface coating 31 is positioned inside the space of the cylindrical housing 25 as defined by the inner wall 26.

Figure 1:
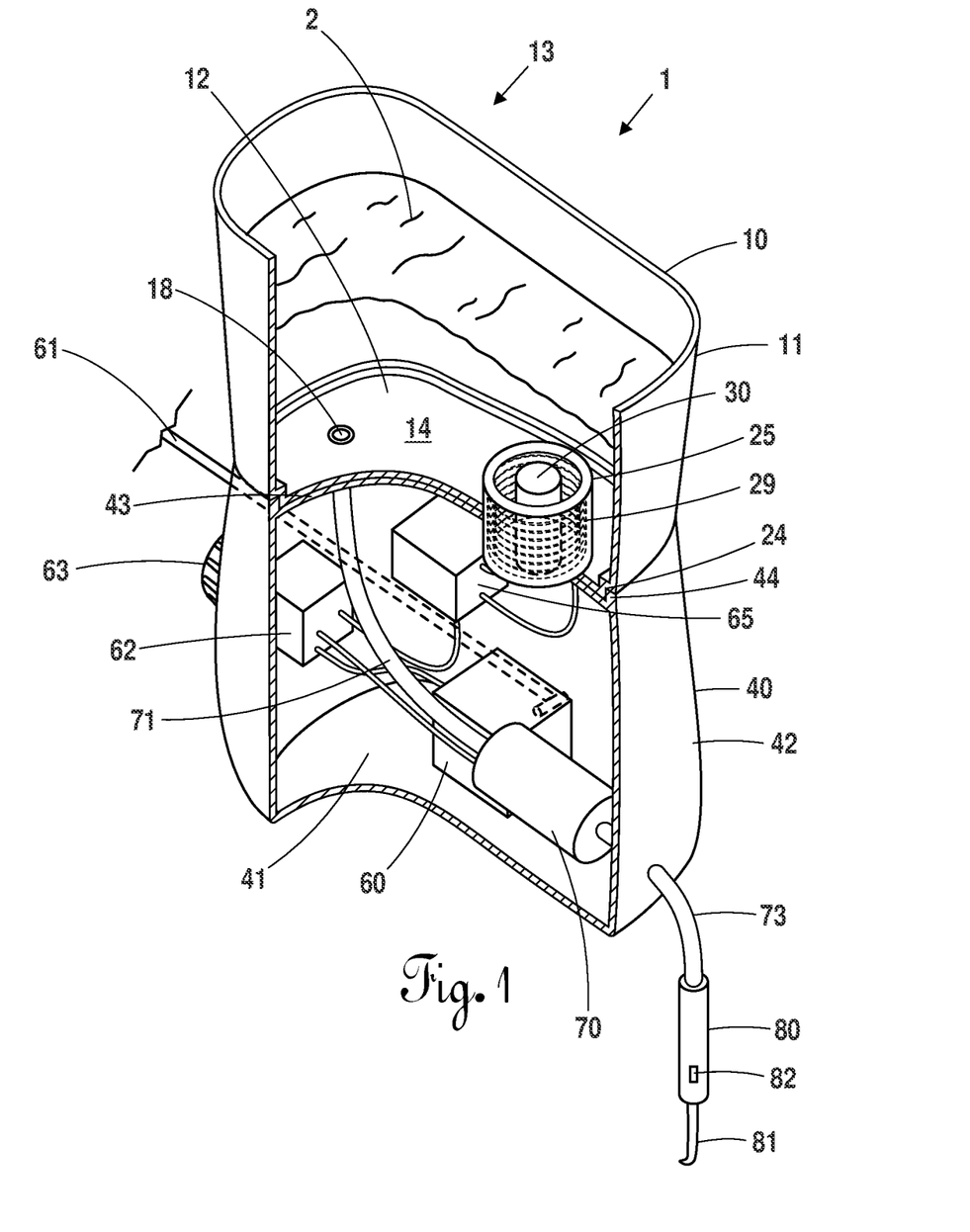
FIG. 1 is a perspective view of a first embodiment with a portion of the sidewall removed.
Figure 2:
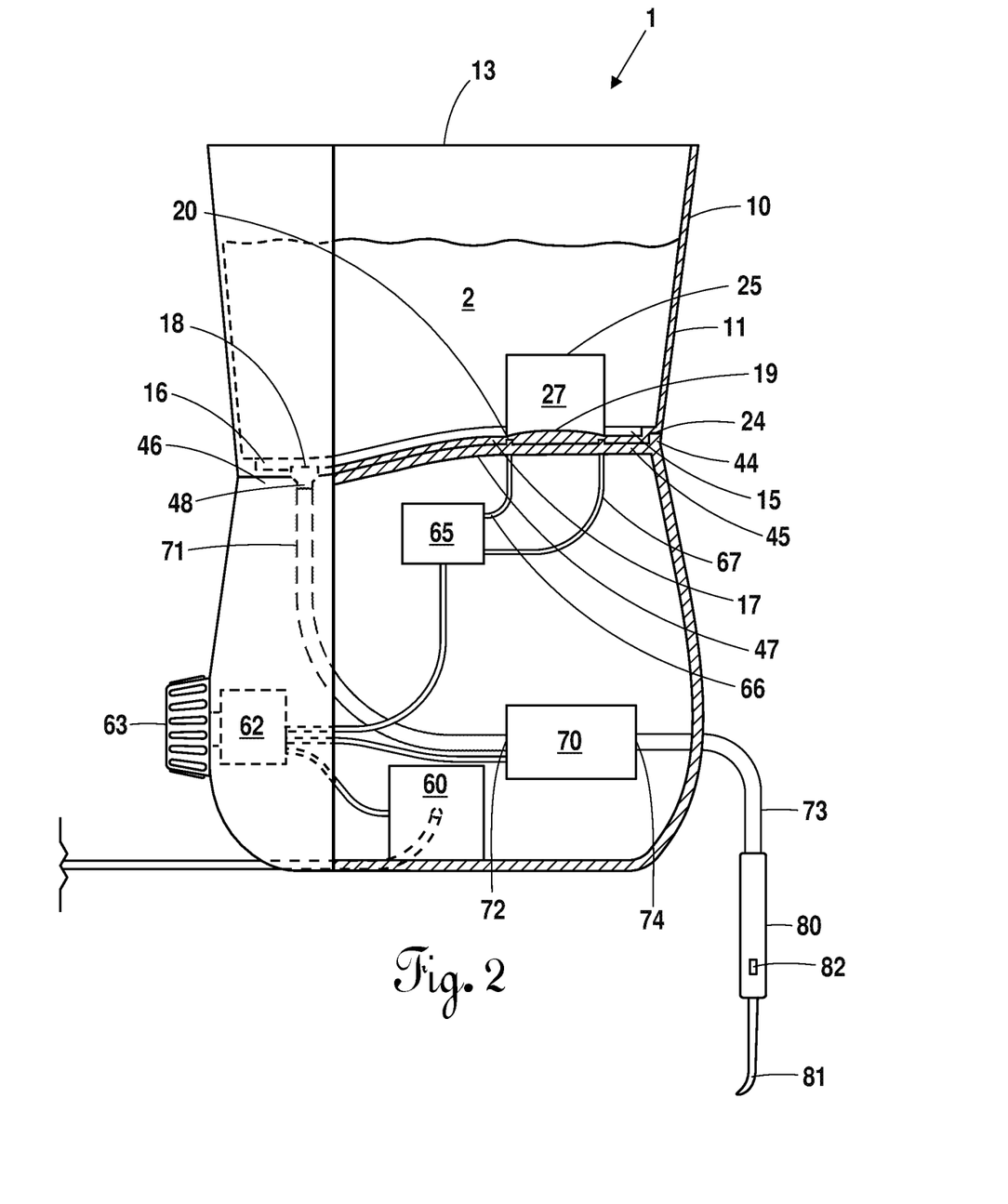
FIG. 2 is perspective cross section view of a first embodiment.
Figure 3:
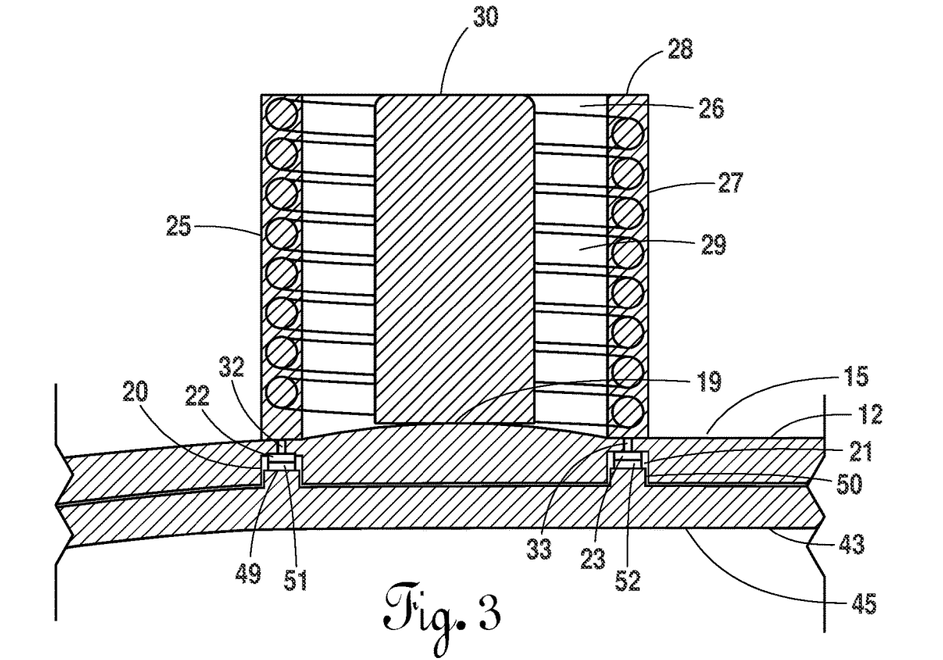
FIG. 3 is a cross-section view of the cylindrical housing of a first embodiment.
Figure 4:
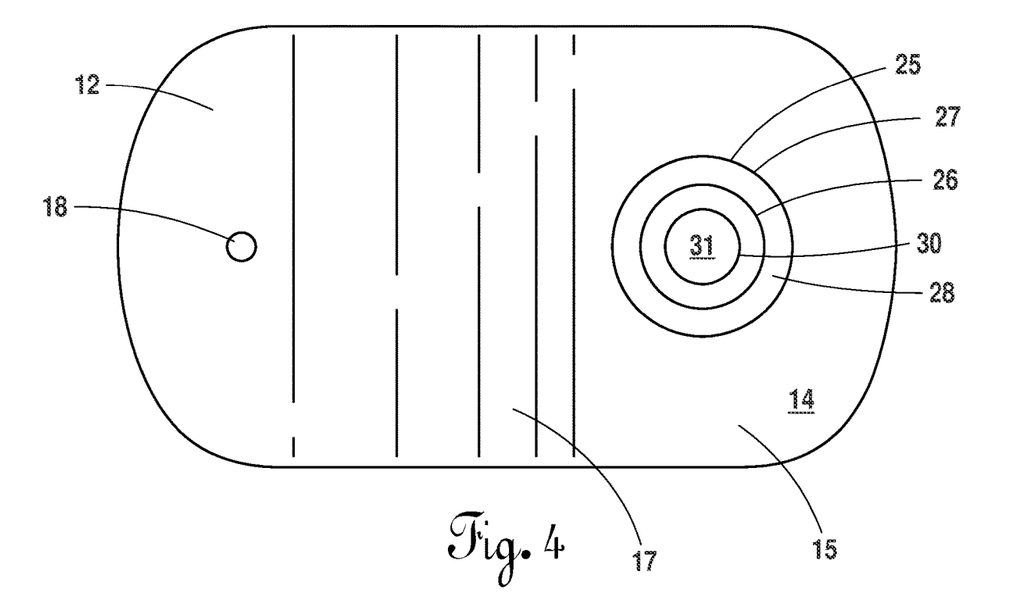
FIG. 4 is a top view of the bottom wall of the basin of a first embodiment.

The base 40 comprises a bottom wall 41, sidewall 42, and top wall 43. A continuous raised ridge 44 extends from the juncture of the sidewall 42 and top wall 43. The size of the raised ridge 44 corresponds to the size of the notch 24 of the basin 10. The top wall 43 is continuous having a raised portion 45 and a lowered portion 46 connected by a slope 47. The raised portion 45, lowered portion 46, and slope 47 of the top wall 43 of the base 40 correspond to the raised portion 15, lowered portion 16, and slope 17 of the bottom wall 12 of the basin 10. An orifice 48 is positioned through the lower portion 46 of the top wall 43. The orifice 48 is sized to receive the port 18 of the basin 10. A first tab 49 and second tab 50 extend from the top surface of the top wall 43. The first tab 49 corresponds in size to the first recess 20 of the basin 10 and the second tab 50 corresponds in size to the second recess 21 of the basin 10. A third metal connectivity tab 51 is positioned on the top of the first tab 49 and a fourth metal connectivity tab 52 is positioned on the top of the second tab 50.

Figure 5:
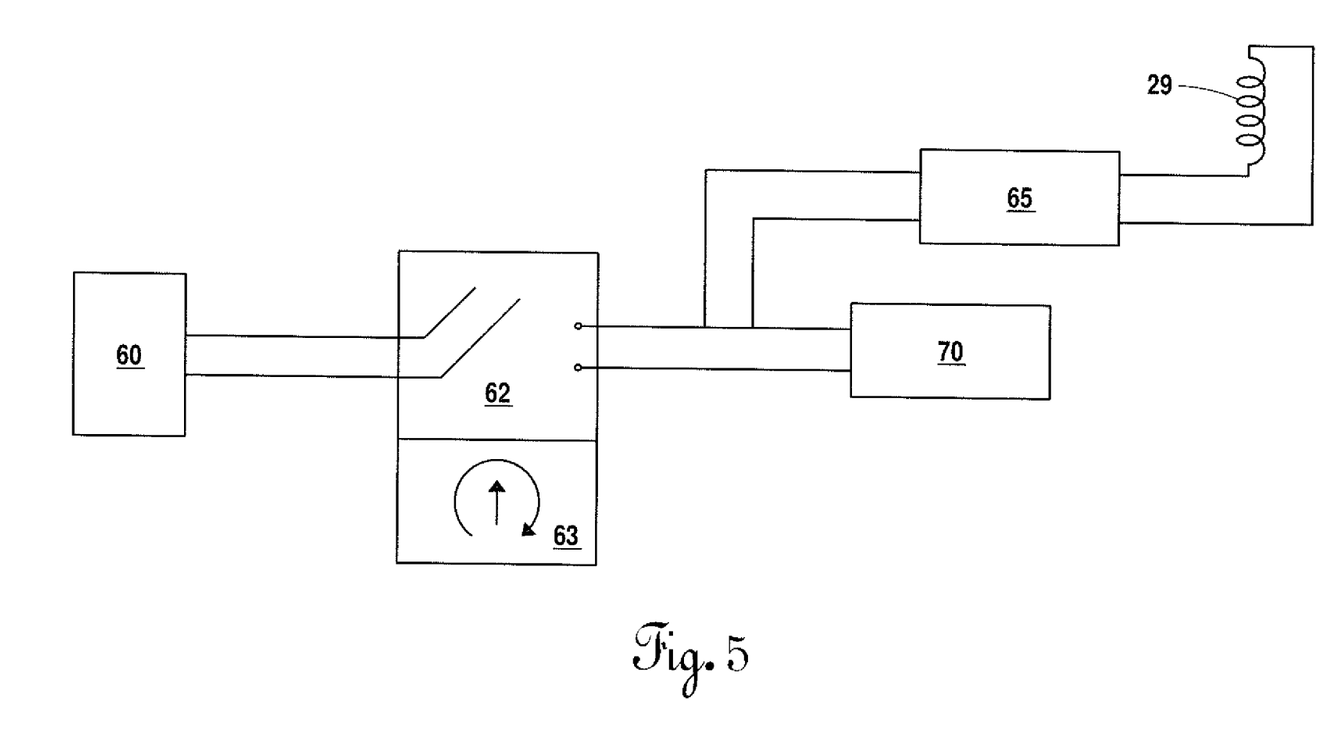
FIG. 5 is a circuit diagram of a first embodiment.

The base 40 includes a power supply module 60, controller 62, oscillator 65, pump 70, and a handheld dispenser 80. A power supply module 60, positioned within the base 40, receives power via a cord 61 from an AC source. As seen in FIG. 5, the power supply module 60 supplies power to the controller 62, oscillator 65, and pump 70. The controller 62, positioned within the base 40, is connected to an interface 63 positioned on the exterior surface 53 of the base 40. The interface 63 may be a physical dial, physical buttons, and/or a graphical user interface. The controller 62 is electronically connected to the oscillator 65 and the pump 70. The electronic oscillator 65, positioned within the base 40, is electronically connected to the third metal connectivity tab 51 via a first wire 66 and connected to the fourth metal connectivity tab 52 via a second wire 67 resulting in a complete circuit. The electronic oscillator 65 is at least capable of delivering a 40-60 kHz signal but may be higher or lower. An interface that is a mechanically driven timer may serve as the control to the oscillator 65 and may prevent the oscillator 65 from working while a user is not present and may also provide an automatic shutoff. Other safety features may be programmed into the controller 62 to prevent operation over an allotted time, prevent the oscillator 65 from operating at too high or too low of frequency, or other safety measures known in the art to include a flow switch, a water level sensor, and/or a thermostat.

A supply tube 71 is connected to the orifice 48 and to the inlet 72 of the pump 70. The supply tube 71 is in fluid communication with the basin 10 via port 18 and orifice 48. A dispensing tube 73 is connected to the outlet 74 of the pump 70 and the handheld dispenser 80. The supply tube 71 and pump 70 are positioned within the base 40 with a portion of the dispensing tube 73 positioned within the base 40 and extending through the sidewall 42 of the base 40. The pump 70 may provide a continuous flow or modulated flow. The handheld dispenser 80 has tip 81 and is operated by a manual valve 82 which may pause or stop the flow of solution.

In operation, the basin 10 is filled with a solution 2 such as water and placed onto the base 40 in a nested arrangement. The raised edge 44 of the base 40 fits into notch 24 of the basin 10, the first tab 49 and second tab 50 fit within the first recess 20 and second recess 21 respectively, the contours of the bottom wall 12 of the basin 10 and top wall 43 of the base 40 are aligned, and port 18 and orifice 48 are aligned. A solute such as NaCl, whitening agent, mouthwash, or other compound such as medicine may be added to the solution. A user then operates the interface 63 to turn the device on. Depending on the setting, the oscillator 65 sends a frequency to the inductive coil 29. An electromagnetic field is generated with the slug 30 acting as an acoustic transducer. The electromagnetic field heats the slug 30 and causes it to vibrate. The vibration of the heated slug 30 further heats the solution the solution and ultrasonically mixes the solute in the solution. The convex surface 19 permits the slug 30 to vibrate more as there is less surface area friction due to the small point of contact with the bottom wall 12. The heated solution aids in both dissolving the solute and in treating temperature sensitive teeth.

The pump 70 receives the solution via the supply tube 71 and then delivers the pressurized solution to the dispenser 80 via the dispensing tube 73. The manual valve 82 on the dispenser 80 may pause the flow of the solution. The operation of the pump 70 is controlled by the controller 62 and may have various pressure settings and various modulating settings. The temperature of the solution may be modified by the controller 62 depending on the frequency of the oscillator 65.

In an alternate embodiment, the cylindrical housing may be integral with the top wall of the base. In this configuration, the first wire and second wire may directly contact the first end and second end of the inductive coil respectively. The bottom wall of the basin may have inset that corresponds to the shape of the cylindrical housing with a convex portion located at the bottom of the inset. This structure would ensure the inductive coil is isolated from the solution by the cylindrical housing and the inset of the basin.

FIGS. 6-11 disclose a second embodiment of a dental irrigation device 100 comprising a basin 110, a base 140, and a dispenser 180. The basin 110 comprises a sidewall 111, a bottom wall 112, and an open top 113. Alternatively a removable lid may be placed on top of the basin 110. The top surface 114 of the bottom wall 112 is continuous having a raised portion 115 and a lowered portion 116 connected by a slope 117. The lower portion 116 may further slope to a port 118. A continuous notch 124 is formed at the juncture of the sidewall 111 and bottom wall 112.

A circular cage 125, having side posts 126 and top posts 127, is positioned on the raised portion 115 of the bottom wall 112 of the basin 110. A ferrous slug 130 having a polymer surface coating 131 is positioned inside the circular cage 125. The length of the ferrous slug 130 is longer than length of the side posts 126 but shorter than the diameter of the circular cage 125.

Figure 6:
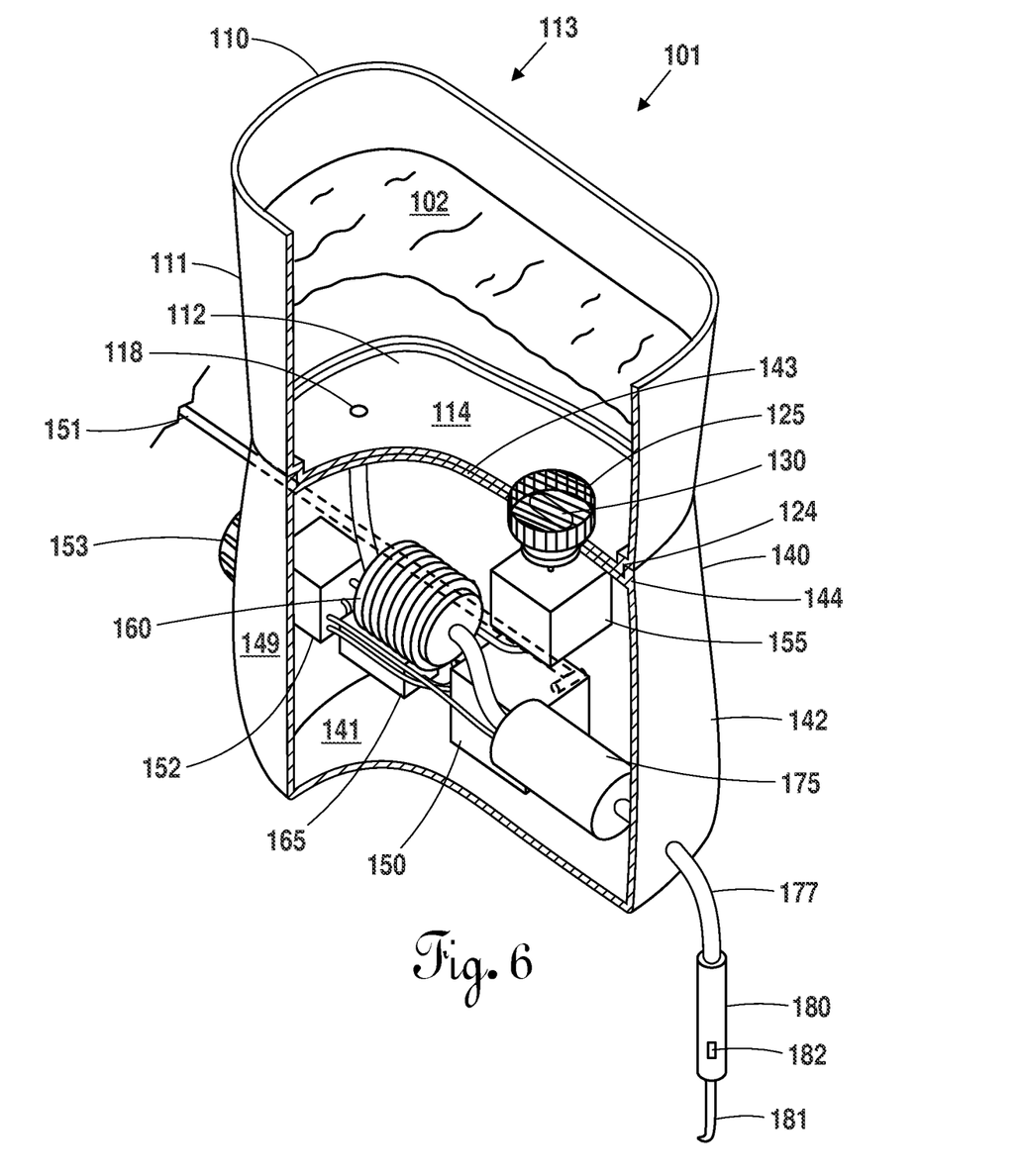
FIG. 6 is a perspective view of a second embodiment with a portion of the sidewall removed.
Figure 7:
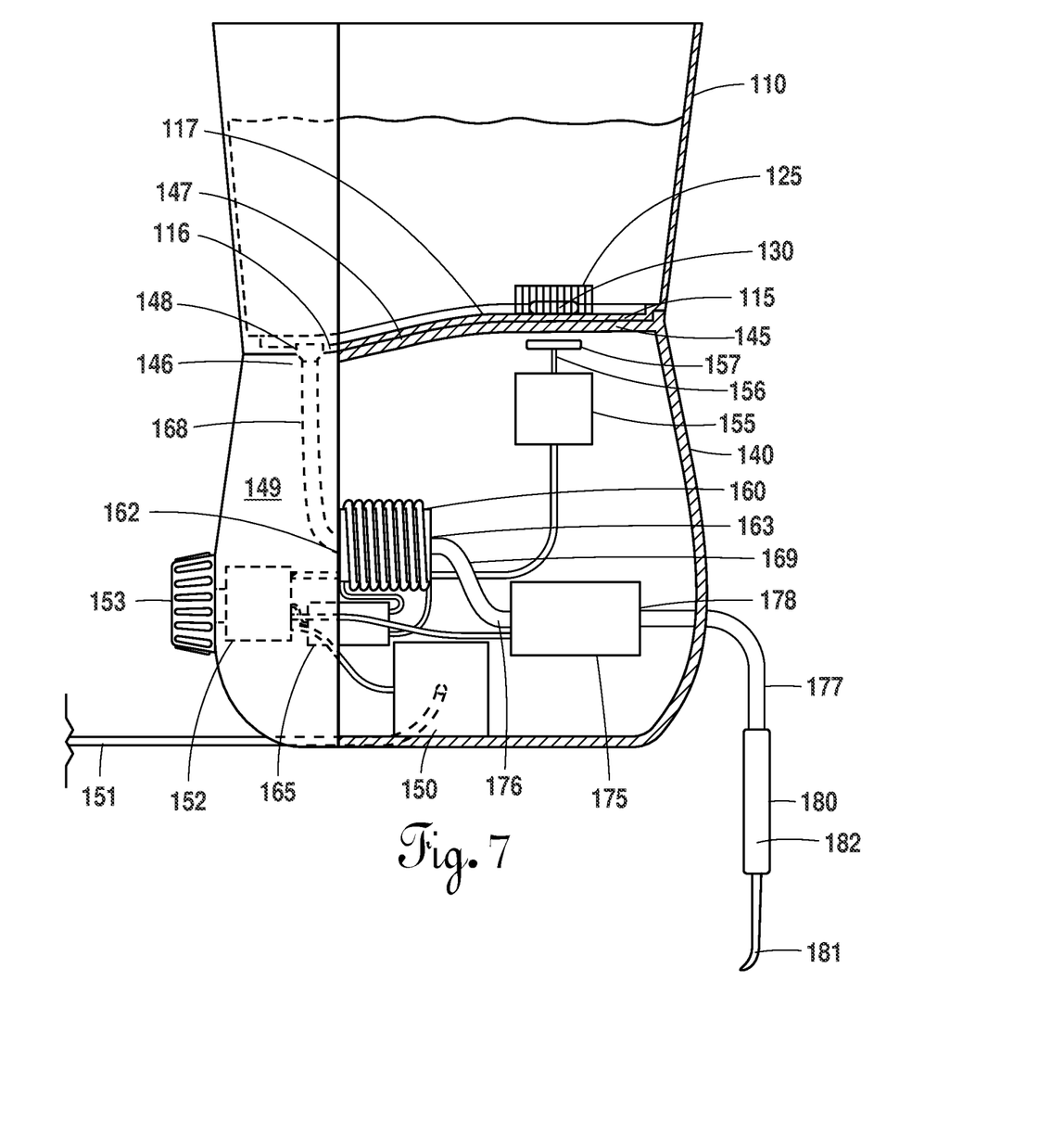
FIG. 7 is a side view of a second embodiment with a portion of the sidewall removed.
Figure 8:
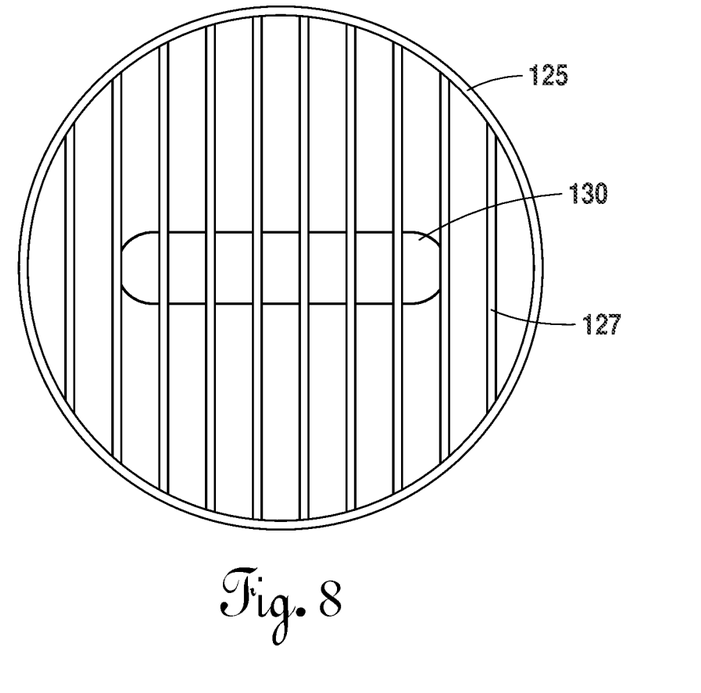
FIG. 8 is a top view of the cage of a second embodiment.
Figure 9:
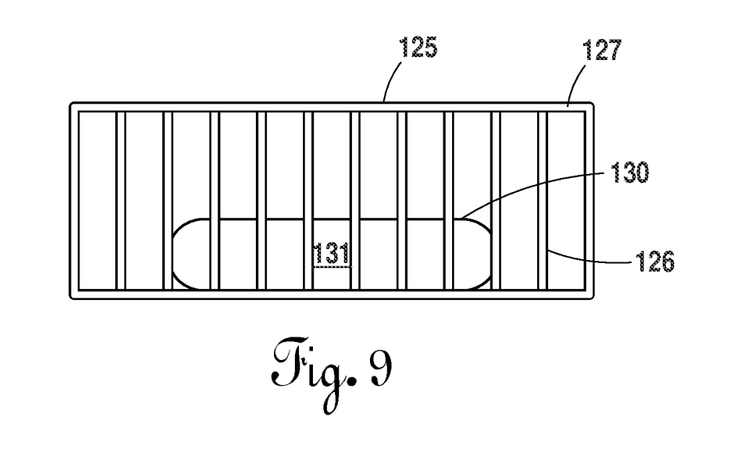
FIG. 9 is a side view of the cage of a second embodiment.

The base 140 comprises a bottom wall 141, sidewall 142, and top wall 143. A continuous raised ridge 144 extends from the juncture of the sidewall 142 and top wall 143. The size of the raised ridge 144 corresponds to the size of the notch 124 of the basin 110. The top wall 143 is continuous having a raised portion 145 and a lowered portion 146 connected by a slope 147. The raised portion 145, lowered portion 146, and slope 147 of the top wall 143 of the base 140 correspond to the raised portion 115, lowered portion 116, and slope 117 of the bottom wall 112 of the basin 110. An orifice 148 is positioned through the lower portion 146 of the top wall 143. The orifice 148 is sized to receive the port 118 of the basin 110.

Figure 11:
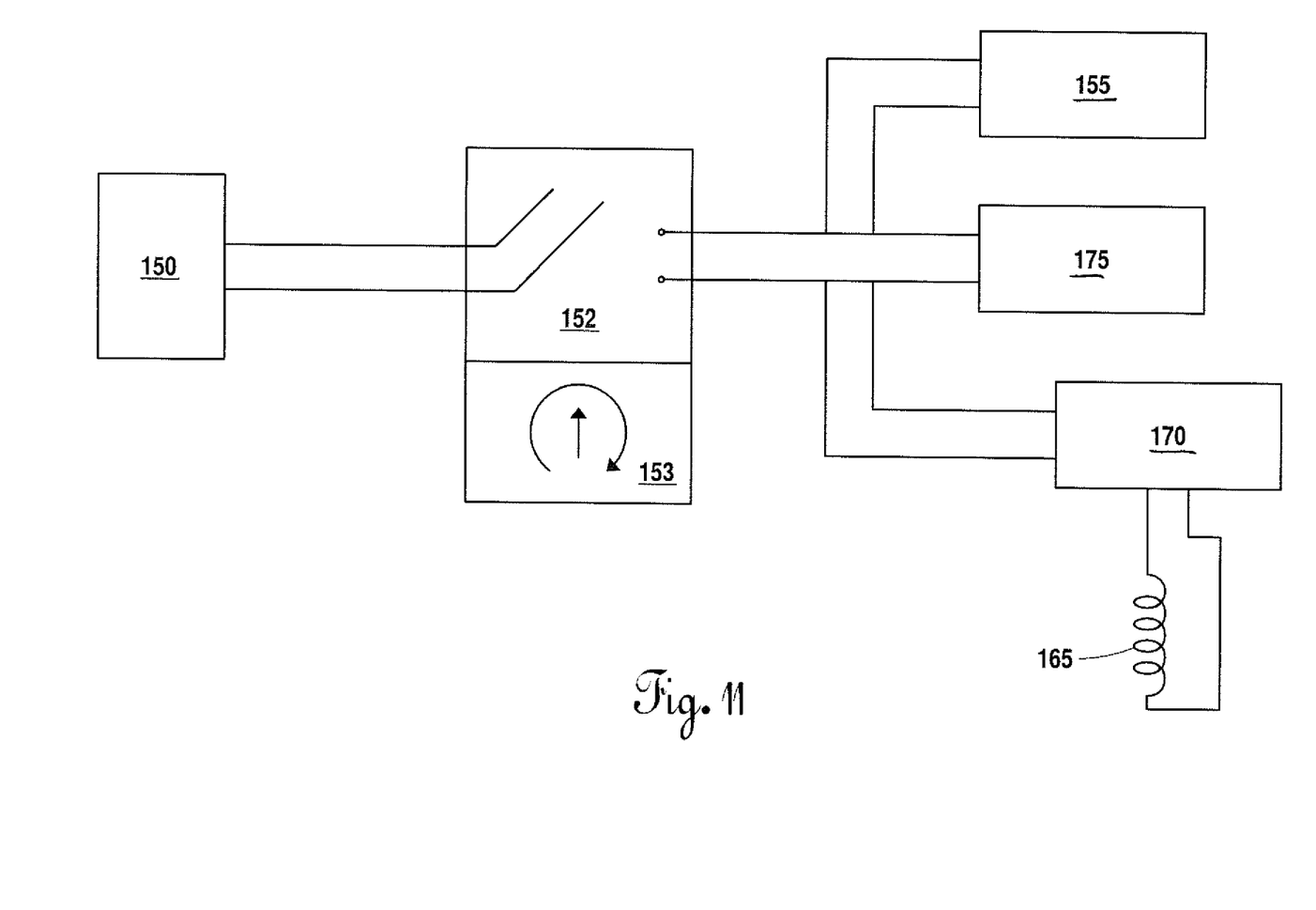
FIG. 11 is a circuit diagram of a second embodiment.

The base 140 includes a power supply module 150, controller 152, motor 155, heating chamber 160, oscillator 170, pump 175, and a dispenser 180. The power supply module 150, positioned within the base 140, receives power via a cord 151 from an AC source. As seen in FIG. 11, the power supply module 150 supplies power to the controller 152, motor 155, oscillator 170, and pump 175.

The controller 152, positioned within the base 140, is connected to an interface 153 positioned on the exterior surface 149 of the base 140. The interface 153 may be a physical dial, physical buttons, and/or a graphical user interface. The controller 152 is electronically connected to the motor 155, oscillator 170, and the pump 175. An interface that is a mechanically driven timer may serve as the control to the oscillator 170 and may prevent the oscillator from 170 working while a user is not present and may also provide an automatic shutoff. Other safety features may be programmed into the controller 152 to prevent operation over an allotted time, prevent the oscillator 165 from operating at too high or too low of frequency, or other safety measures known in the art to include a flow switch, a water level sensor, and/or a thermostat.

The motor 155 is positioned within the base 140. A shaft 156, having a rod magnet 157 at its terminal end, extends from the motor 155. The rod magnet 157 is positioned adjacent raised portion 145 of the top wall 143 within the base 140. The rod magnet 157 is positioned under the circular cage 125 of the basin 110. When the motor 155 is operational, the shaft 156 rotates which causes the rod magnet 157 to rotate.

Figure 10:
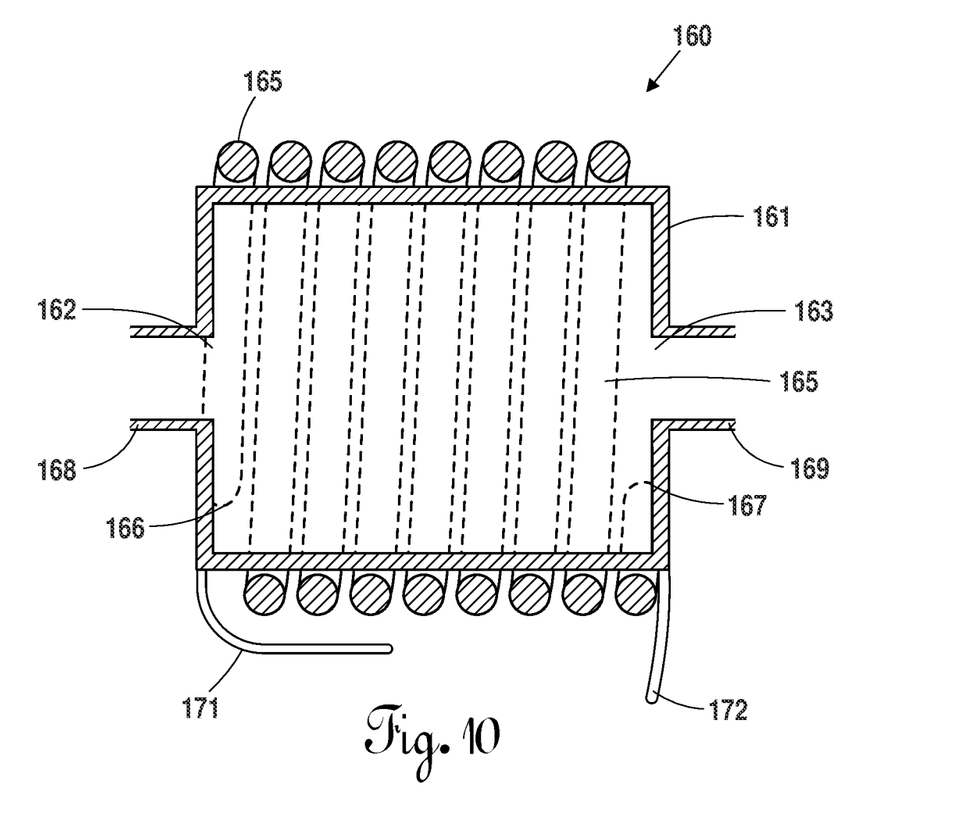
FIG. 10 is a cross-section view of the heating chamber of a second embodiment.

The heating chamber 160 and oscillator 170 are positioned within the base 140. The heating chamber 160 comprises a sidewall 161, inlet 162, and outlet 163 that define a cavity 164. The heating chamber 160 is constructed of a ferrous material. The interior surface of the heating chamber 160 is coated or plated with a non-reactive polymer or a copper plating to inhibit rust formation. An inductive coil 165, having a first end 166 and a second end 167, wraps around the exterior surface of the sidewall 161. The inductive coil 165 may or may not contact the sidewall 161. The inductive coil 165 is preferably insulated. The electronic oscillator 170 is electronically connected to the first end 166 of the inductive coil 165 via a first wire 171 and connected to the second end 167 of the inductive coil 165 via a second wire 172 resulting in a complete circuit. The electronic oscillator 170 is at least capable of delivering a 40-60 kHz signal but may be higher or lower. The structural form of the inductive coil 165 with the oscillator 170 is that of an air core conductor but with the ferrous material of the heating chamber 160 it becomes a ferrous inductor.

A supply tube 168 is connected to the orifice 148 and to the inlet 162 of the heating chamber 160. The supply tube 168 is in fluid communication with the basin 110 via port 118 and orifice 148. An intermediary tube 169 is connected to the outlet 163 of the heating chamber 160 and the inlet 176 of the pump 175. A dispensing tube 177 is connected to the outlet 178 of the pump 175 and the dispenser 180. The supply tube 168, intermediary tube 169, and pump 175 are positioned within the base 140 with a portion of the dispensing tube 177 positioned within the base 140 and extending through the sidewall 142 of the base 140. The pump 175 may provide a continuous flow or modulated flow. The handheld dispenser 180 has tip 181 and is operated by a manual valve 182 which may pause or stop the flow of solution.

In operation, the basin 110 is filled with a solution 101 such as water and placed onto the base 140 in a nested arrangement. The raised edge 144 of the base 140 fits into notch 124 of the basin 110, the contours of the bottom wall 112 of the basin 110 and top wall 143 of the base 140 are aligned, and port 118 and orifice 148 are aligned. A solute such as NaCl, whitening agent, mouthwash, or other compound such as medicine may be added to the solution. A user then operates the interface 153 to turn the device on. If the user is seeking to add a solute, the user may activate the mixing function through the interface. In this instance, the controller turns on the motor 155 which causes the shaft 156 and rod magnet 157 to rotate. As the rod magnet 157 rotates, the magnetic attraction causes the ferrous slug 130 to rotate within the cage 125. As the slug 130 rotates, it causes the solute to mix with or dissolve within the solution by creating a vortex. The cage 125 allows solution and solute to freely enter and leave the cage 125 while preventing the slug 130 from moving away from the magnetic force created by the spinning rod magnet 157.

The solution 101 is drawn into the supply tube 168, via the port 118 and orifice 148, through the inlet 162 and into the cavity 164 of the heating chamber. Depending on the heat setting, the oscillator 170 sends a frequency to the inductive coil 165. An electromagnetic field is generated causing the sidewall 161 of the heating chamber 160 to heat up. Additionally, eddy currents are generated creating additional heat that is absorbed by the solution 101. The heated solution 101 aids in both dissolving the solute and in treating temperature sensitive teeth.

The heated solution 101 is drawn into the pump via the intermediary tube and then delivers the pressurized solution 101 to the dispenser 180 via the dispensing tube 177. The manual valve 182 on the dispenser 180 may pause the flow of the solution 101. The operation of the pump 175 is controlled by the controller 152 and may have various pressure settings and various modulating settings. The temperature of the solution 101 may be modified by the controller 152 depending on the frequency of the oscillator 170.

A person of ordinary skill in the art may modify the circuit of each embodiment to add safety measures and/or additional controls to prevent over mixing, over-heating, or reduce potential for electric shocks.

Although the invention hereof has been described by way of two preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A dental irrigation device comprising
a basin having a bottom wall,
a ferrous inductor coil,
a ferrous slug,
a pump,
and a dispenser.

2. The dental irrigation device of claim 1 further comprising a cylindrical housing having an open top end and a sidewall comprising an inner sidewall and outer sidewall wherein at least a portion of the ferrous inductor coil is positioned within the sidewall and wherein the sidewall extends from the bottom wall of the basin.

3. The dental irrigation device of claim 2 wherein the ferrous slug is positioned within the inner wall of the cylindrical housing.

4. The dental irrigation device of claim 3 wherein the portion of the bottom wall of the basin between the inner wall of the cylindrical housing is convex.

5. A dental irrigation device comprising
a basin having a bottom wall and an outlet, a cylindrical housing having an inner wall, outer wall, and top wall defining a wall cavity and an inner cavity;
a ferrous inductor coil at least partially positioned within the wall cavity;
a ferrous slug positioned within the inner cavity; and
a pump connected to the outlet and to a dispenser.

* * * * *